MOUNTING AND CONNECTION SYSTEM FOR SEMICONDUCTOR DEVICES

Filed April 23, 1962 3 Sheets-Sheet 1

INVENTOR.
Harry da Costa,
BY Mueller & Aichele
Atty's.

MOUNTING AND CONNECTION SYSTEM FOR SEMICONDUCTOR DEVICES

Filed April 23, 1962 3 Sheets-Sheet 2

INVENTOR.
Harry da Costa,
BY Mueller & Aichele
Att'ys.

MOUNTING AND CONNECTION SYSTEM FOR SEMICONDUCTOR DEVICES

Filed April 23, 1962 3 Sheets-Sheet 3

*INVENTOR.*
Harry daCosta

*BY* Mueller & Aichele

ATTY'S.

United States Patent Office 3,153,751 Patented Oct. 20, 1964

3,153,751

MOUNTING AND CONNECTION SYSTEM FOR SEMICONDUCTOR DEVICES

Harry da Costa, Scottsdale, Ariz., assignor to Motorola, Inc., Chicago, Ill., a corporation of Illinois Filed Apr. 23, 1962, Ser. No. 192,617
10 Claims. (Cl. 317—234)

This invention relates to semiconductor devices and more particularly to transistors of diminutive size whose structure permits their quick and easy assembly and to an improved method of assembling such a small article of manufacture which method is relatively simple and inexpensive, does not require the employment of highly skilled operators and yet at the same time is adapted to the production of transistors of uniform characteristics meeting desired electrical specifications.

This application is a continuation-in-part of a copending application Serial No. 692,656, filed on October 28, 1957.

The manufacture of transistors involves a number of problems caused by the extreme diminutiveness of the parts making up such devices. For example, the semiconductor die of a transistor is often as small as 0.14 inch in diameter and about 0.006 inch in thickness. Electrodes carried on such a die are usually beads or discs of indium ranging in diameter from about 0.04 inch to about 0.06 inch. The handling and especially the accurate positioning of such small items poses substantial practical problems in transistor assembly operations and in the past has required the employment of highly skilled operators in order that a reasonable yield of satisfactory units may be obtained in production runs. Even skillful and experienced operators have difficulty in handling and accurately aligning the minute components of a transistor so that assembly is normally carried out under a microscope and positioning of the various component parts is often done with the aid of a pantograph or similar expensive instruments to permit minute movement of the parts. All of this naturally adds to the overall expense of transistor manufacture. In addition, because of the difficulties inherent in manipulating the very small articles, transistor manufacturing has often been characterized by rather low yields of satisfactory products and by lack of uniformity in the products of different units manufactured in accordance with the same method.

Largely because of the difficulty inherent in handling minute objects, the assembly of transistors has generally been a hand-assembly operation and has not been particularly well adapted for the utilization of automatic assembly techniques. This, too, has tended to maintain the cost of transistor manufacture at an undesirably high level.

For some applications it is desirable to provide devices which include more than one semiconductor unit. In this manner, a circuit or a portion of a circuit can be integrated into a single electronic device. However, the handling and manipulation problems just referred to become even more severe when assembling a device with more than one semiconductor unit since more component parts are required for the device and the chance of a defect occurring in a given device is increased.

In power transistors, sufficient heat is often generated during operation to affect the electrical characteristics of the unit unless the heat is efffectively dissipated. Heat conductive surfaces of relatively large area and heat dissipating capacity have been provided in heat transfer relation with the semiconductor die to carry away the heat generated there. However, since it is normally desired to make very small transistors, the space available for such heat dissipating members must be utilized efficiently.

It is an object of the present invention to provide an improved transistor structure which is particularly well adapted to relatively easy and inexpensive assembly techniques.

It is another object of the invention to provide a power transistor of improved design wherein the maximum available space is afforded for heat transfer means adjacent the transistor electrodes without increasing the overall size of the unit.

It is another object of the invention to provide an improved method for assembling semiconductor devices, such as transistors, of diminutive size which method does not necessitate the employment of highly skilled operators for the obtaining of satisfactory production yields.

It is another object of the invention to provide a method of assembling a semiconductor device whereby alignment of various elements of the transistor with respect to one another takes place automatically so that such alignmnet is uniform and reproducible in each successive unit fabricated.

It is a further object of the invention to provide a device including more than one semiconductor unit which can be assembled in a reproducible manner on a mass production basis.

It is still another object of the invention to provide an improved method for the assembly of diminutive transistors which method is adapted to automatic assembly techniques.

A feature of the invention is the provision of a method of assembling a semiconductor device including one or more semiconductor units, wherein various elements of the device are stacked vertically on top of one another with adjacent elements in contact and then heated so that the adjacent elements are secured to one another by the softening of certain portions and settle by gravity into positions determined by spacer means arranged between the elements.

Another feature of the invention is the use of a vertically extending annular jig or fixture fitting around the periphery of the mounting base of a diminutive transistor for positioning a plurality of transistor elements in relation to the mounting base and also for the positioning of horizontal spacer means which are used to control the vertical spacing between some of the adjacent transistor elements.

Another feature of the invention is the provision in a transistor of an essentially flat electrode connector member having a projection or boss formed in its surface for contacting the protruding electrode carried on the surface of a semiconductor die positioned adjacent the plate. The projection or boss facilitates the positioning of the connector with respect to the semiconductor die at a predetermined distance from the surface of the die in making connection between the electrode and plate by heating the die thus causing it to soften and become secured to the boss contacting it. The flat surface of the connector member permits it to settle into a desired position on top of horizontal spacer means.

Another feature of the invention is the provision of a power transistor which includes a semiconductor die unit one of whose electrodes rests in contact with a pedestal rising from the mounting base of the transistor with the other electrode having a projection from an electrode connector plate resting on it. The pedestal and the projection provide electrical connection and also serve to carry heat from the semiconductor electrodes to the mounting base and the connector plate both of which are effective heat dissipating means.

Another feature of the invention is the provision of base and electrode connector members with notches on their edges to facilitate their being dropped into a jig in alignment with vertical leads to which the members are secured as by soldering.

A further feature of the invention is the provision of an electronic device which includes at least two semiconductor units mounted on respective connector plates which are spaced vertically from each other and over a mounting base. Additional connector plates may be included to provide electrical connections between the semiconductor units and leads, and all of the plates may be assembled by stacking such that the final device has several levels of decks.

Figure 1:
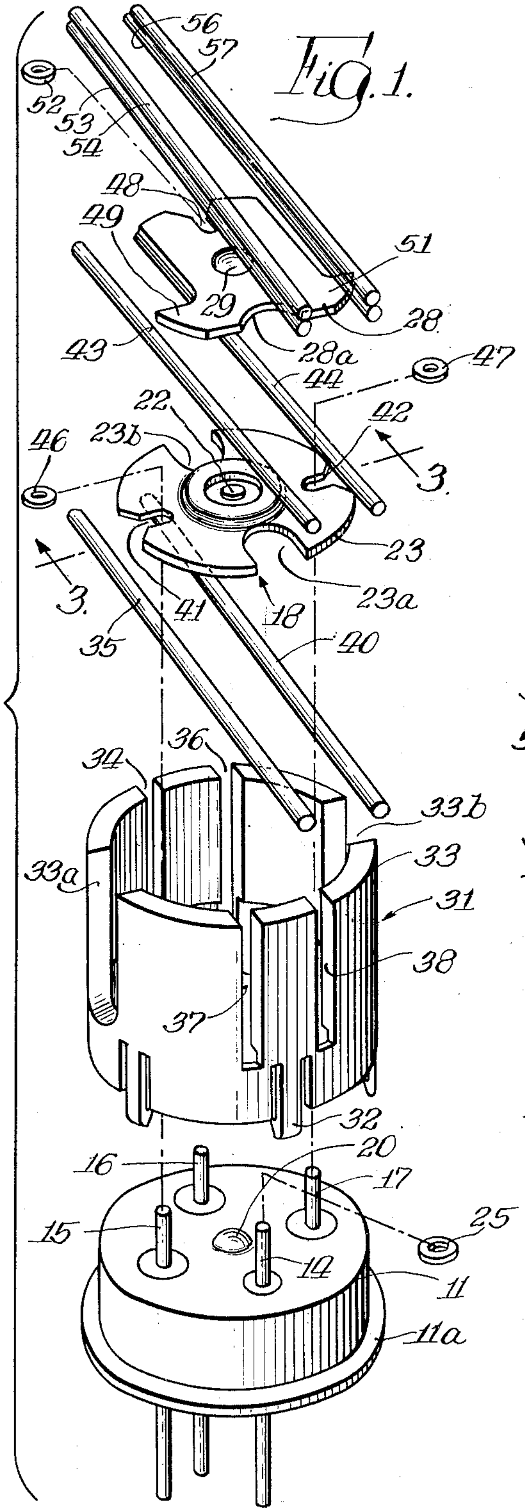
FIG. 1 is an exploded perspective view showing the various parts of a transistor as they are assembled in accordance with one specific embodiment of the present invention.

In accordance with one embodiment of this invention, an improved transistor structure includes a horizontally disposed die with a pair of electrodes on the opposite surfaces thereof. One electrode is secured to a projection rising from the surface of a mounting base and the other secured to a projection from the surface of a horizontally disposed electrode connector plate. The mounting base and the connector plate both serve as effective heat dissipating members so that the improved structure is effective as a power transistor. In another embodiment of the invention, the semiconductor die is disposed between a pair of horizontally disposed connector plates with one electrode secured to a projection from each plate. An additional embodiment includes two semiconductor die elements, and these are arranged with one above the other and with one connector plate between the die elements and other connector plates above and below the die elements.

Assembly of the transistor is accomplished simply, accurately and rapidly by placing an annular jig around the mounting base and successively dropping the various horizontally disposed parts of the transistor into the jig. Slot means formed in the edges of the parts facilitate their alignment with the upright leads of the mounting base to which leads the parts are to be connected. A plate-like carrier for a semiconductor die is dropped onto horizontal spacer means resting on the top surface of the mounting base with an electrode extending from the semiconductor die surface falling onto a projection extending from the conductive metal layer forming the top surface of the mounting base. Additional horizontal spacer means are dropped into the jig followed by the electrode connector plate which falls with a projection from its surface contacting the electrode extending from the upper surface of the die. This assembly of parts is heated to soften the electrodes causing them to flow and be secured to the projections contacting them. At the same time, the parts are secured to the upright leads by the melting of appropriately positioned solder rings. With the parts maintained against transverse movement by their configuration and by the jig and with the vertical movement limited by the spacer means, there is assurance that the desired alignment will be maintained as the parts are secured to one another during the heating operation.

In assembling of the embodiment of the invention including a pair of connector plates, the first connector plate is dropped into the jig onto spacer means in such a position that a projection extends upwardly from its surface. Spacer means are dropped into the jig above the connector plate and the semi-conductor die and the other spacer means and the other connector plate dropped into the jig as in the assembly of the other embodiment. A partially assembled unit is then heated to secure the electrodes to the projections they contact.

In assembling all embodiments an alignment of the component parts is self-regulating so that an operator need only drop them into the jig in their proper order to assemble the transistor. This greatly simplifies the assembly process and permits the employment of less skilled labor than is otherwise possible. The use of the spacer bars permits the various components to be accurately and automatically spaced a predetermined vertical distance from one another.

A specific embodiment of this invention is a medium power, audio-frequency transistor, the component parts of which are shown in FIG. 1 of the accompanying drawings in an exploded view illustrating the assembly of such a unit. The transistor includes a generally round mounting base 11 which is made up of a body portion 12 of glass, ceramic or other suitable insulating material and covered with a layer 13 of suitable conductive metal. (See FIGS. 5 and 6.) In accordance with one embodiment of the invention the layer 13 is of a nickel-iron-cobalt alloy and is covered with a very thin layer of gold (not shown) on the order of 0.000025 inch in thickness. The metal layer 13 covers the top and sides of body portion 12 except for annular portions adjacent the upright mounting leads 14, 15, 16 and 17 to avoid undesired short circuiting of these leads to the metal layer. Leads 14, 15 and 16 extend through the mounting base 11 for subsequent electrical connection to the various elements of the transistor and to provide connection to the circuits in which the transistor will operate. The lead 17 extends only above the surface of the mounting base 11 and serves as a support for one of the elements of the transistor as will be more fully explained later. These leads are made of the same nickel containing alloy as the cover layer 13. An upwardly extending projection or pedestal 20 is formed in the layer 13 centrally of the upper surface of mounting base 11 which surface is substantially flat.

Figures 2, 3, 4:
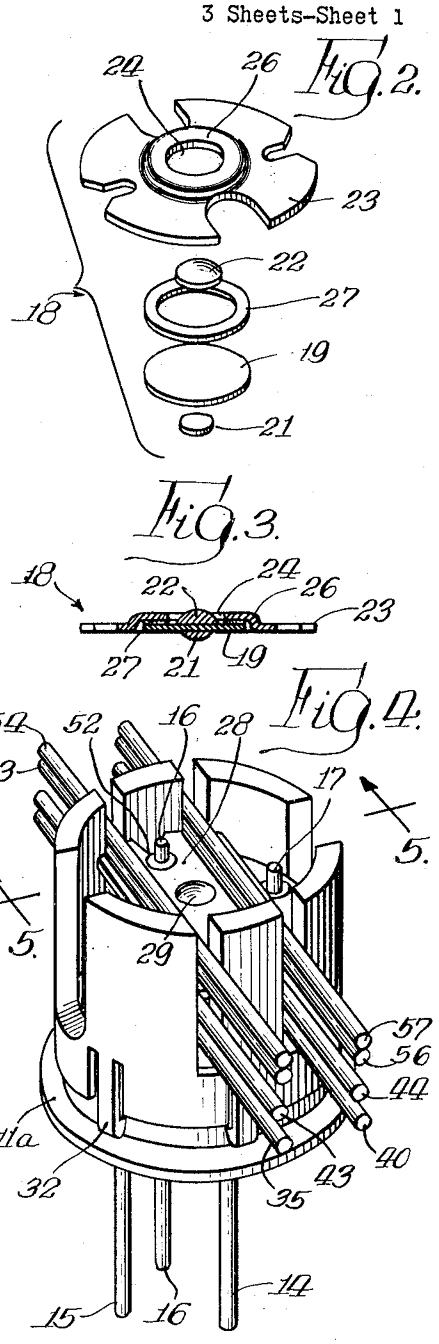
FIG. 2 is an exploded perspective view showing the various parts of a semiconductor die and base connector subassembly illustrated in FIG. 1.
FIG. 3 is a view in section taken on the line 3—3 of FIG. 1.
FIG. 4 is a perspective view showing a transistor in accordance with one embodiment of the invention at one stage of its assembly with the component parts thereof appropriately aligned in a suitable jig.

The transistor further includes a semiconductor die unit 18 which is more fully illustrated in FIGS. 2 and 3. In the particular embodiment illustrated the die unit 18 includes a round flat germanium die 19 of N-type conductivity and with emitter electrode 21 on one surface thereof and collector electrode 22 on the other surface thereof. The emitter and collector electrodes are beads of indium fused to the respective faces of the germanium die 19 and alloyed to a controlled depth into it by known methods to form a PN junction producing the desired transistor action. If P-type semiconductor material makes up the die 19, the electrodes 21 and 22 are of a suitable donor type impurity metal.

Although a specific embodiment of the present invention includes a semiconductor die in which PN junctions have been formed by alloying a semiconductor die may be used wherein one or both of the junctions has been formed by other methods such as diffusion. In such instances, electrical contacts are carried on the faces of the die and serve simply to establish ohmic contact thereto and do not effect the junction characteristics of the transistor. In the appended claims the term "electrical contacts" includes both such ohmic contacts and alloyed electrodes.

The semiconductor die unit 18 also includes a base connector member 23 provided with a central aperture 24. Connector member 23 is made of an electrically and thermally conductive metal or alloy such as "Kovar" and is covered with a thin coating of gold. The annular portion 26 around the aperture 24 is displaced from the major surface of the connector member 23.

As best shown in FIG. 3, the semiconductor die unit 18 includes the die 19 secured to the annular portion 26 by means of the melted solder ring 27 with the collector electrode 22 extending through the opening 24. The soldered junction forms an ohmic base connection between die 19 and connector 23.

Although FIG. 2 is in the form of an exploded view showing the various component parts of the semiconductor die unit 18 with more clarity, it will be understood that the die unit 18 is preassembled to the form shown in FIGS. 1 and 3 prior to the assembly steps to be described in connection with this invention.

Figures 5, 6, 7, 8, 9, 10:
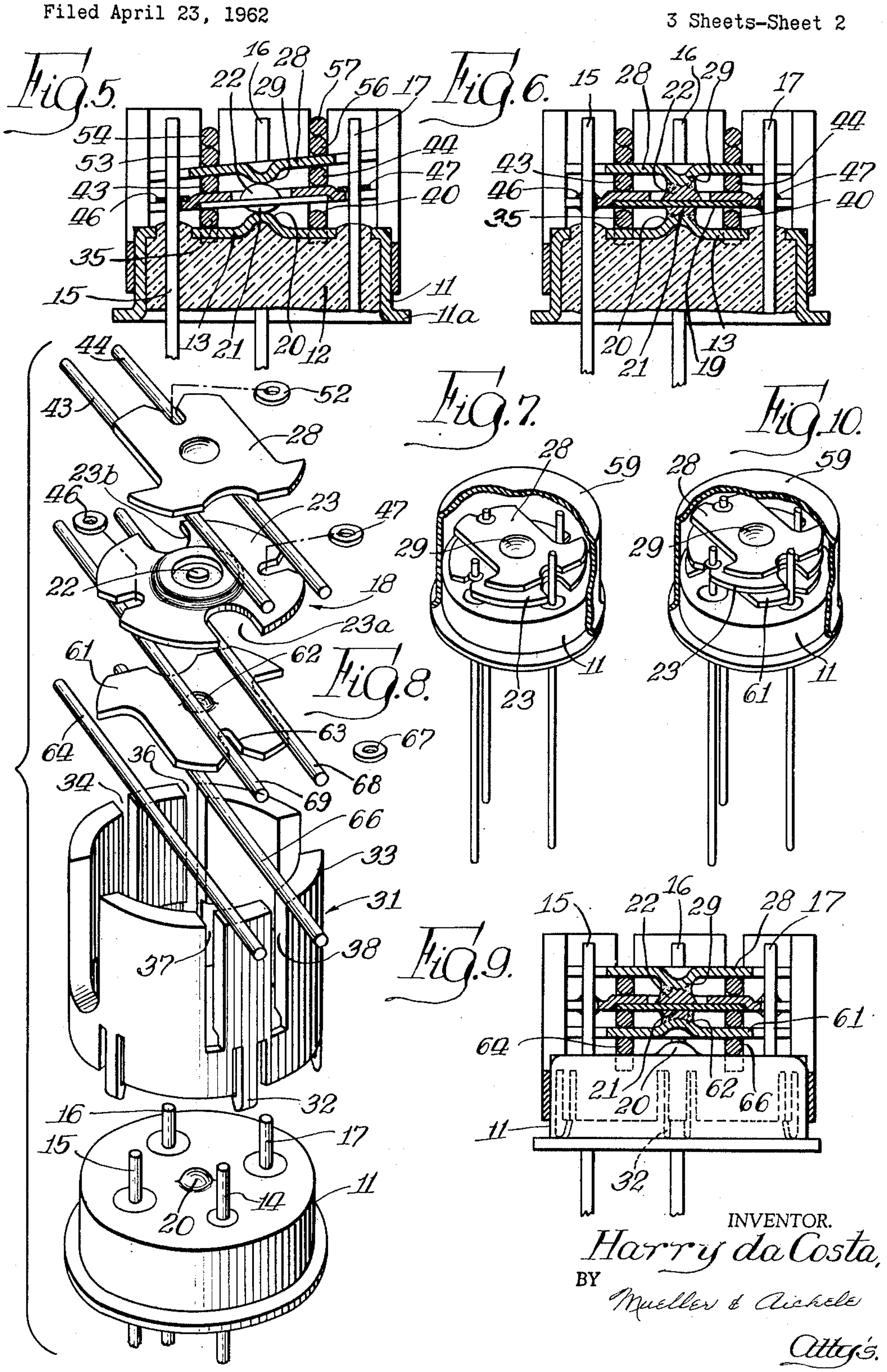
FIG. 5 is a view in section taken on the line 5—5 of FIG. 4.
FIG. 6 is a view similar to FIG. 5 showing the alignment of the various transistor parts after heating of the assembly illustrated in FIG. 5.
FIG. 7 is a perspective view of a finished transistor assembled from the parts illustrated in FIGS. 1–6 and showing the cover member of the transistor broken away to better illustrate the arrangement of the various parts of the completed article.
FIG. 8 is an exploded perspective view showing the various parts of a transistor in accordance with another embodiment of the invention as the parts are assembled.
FIG. 9 is a cross sectional view taken through the jig and mounting base portion of a partially assembled transistor containing the component parts illustrated in FIG. 8 showing the arrangement of the component parts thereof after the aligned components have been heated to secure various of them together.
FIG. 10 is a perspective view of a completed transistor in accordance with the embodiment of the invention illustrated in FIGS. 8 and 9 with the cover member broken away to show the arrangement of the various component parts.

The transistor also includes an electrode connector plate 28 which is made of silver covered with a very thin coating of gold. The substantially flat surface of the connector plate 28 is dimpled to provide a minute boss or projection 29 (as shown in FIGS. 5 and 6) which extends downwardly toward the semiconductor die unit 18. In accordance with one embodiment of the invention, the boss 29 extends 0.02 inch from the surface of plate 28.

In order to appreciate the difficult problems inherent in the assembly of a transistor whose parts are illustrated in FIG. 1, it should be borne in mind that these parts are all extremely small. For example, in one embodiment of the invention the germanium die 19 is only 0.14 inch in diameter. The emitter electrode 21 is only about 0.04 inch in diameter while the somewhat larger collector electrode 22 is 0.06 inch in diameter. The overall diameter of the connector plate 23 is about 0.26 inch. The electrode connector plate 28 will fit within a circumscribed circle of 0.26 inch in diameter.

In accordance with this invention, easy and accurate alignment of the various parts of the transistor for assembly is accomplished by the use of an annular jig or fixture 31 which is slipped over the mounting base 11 and rests on the annular lip 11*a* as best shown in FIGS. 5 and 6. The jig 31 conforms in shape to the round mounting base 11 and includes spring fingers 32 and a guide portion 33. The guide portion 33 is provided with slots 34, 36, 37 and 38 which extend vertically therethrough and is cut out at portions 33*a* and 33*b* to facilitate dropping parts into the jig. The jig 31 is made of molybdenum or stainless steel and is suitable for reuse with other mounting bases of the same size and shape.

The jig 31 is placed with spring finger 32 on the shoulder 11*a* of the mounting base 11 and resiliently pressing against the sides of the mounting base. The jig is in such a position that none of the upright leads are lined up between the slots that are opposite one another. After the jig 31 is in place, spacer means 35 and 40 are dropped onto the mounting base 11 with spacer 35 fitting into slots 34 and 37 and spacer 40 into slots 36 and 38. Solder ring 25 is dropped over lead 14. The semiconductor die unit 18 is aligned with the slot means 41 and 42 formed in the periphery of connector 23 fitting around leads 15 and 17 respectively and is dropped into the top of the jig 31. Connector plate 23 is also notched along its periphery at 23*a* and 23*b* to provide clearance for leads 14 and 16, respectively. The inside diameter of the guide portion 33 of the jig is such that the semiconductor die unit 18 just fits inside of it with the edges of the connector plate 23 being held against transverse movements by the inner walls of the guide portion 33. The connector plate 23 is thus of substantially the same area as the top surface of the mounting base 11 and so presents a relatively large heat dissipating area within a limited space. The unit 18 is also held against transverse or rotational motion by the leads 15 and 17 fitting in the respective slots 41 and 42. As shown in FIG. 5 the die unit 18 positions itself with emitter electrode 21 resting on the projection 20 of the metal layer 13 forming the upper surface of the mounting base and with the die 19 resting on spacer 35. The metal layer 13 then constitutes a lower electrode connector. This is particularly shown in FIG. 5. It will be understood, of course, that die unit 18 may fall into place tilted in a different direction than shown in FIG. 5 so that die 19 rests on spacer 40.

A second pair of spacer means 43 and 44 are then dropped into the top of the jig with spacer 43 falling into slots 34 and 37 and spacer 44 falling into slots 36 and 38. In the embodiment of the invention illustrated the spacer means are made of 0.02 inch diameter drawn stainless steel wire and about 0.5 inch long so that they extend beyond the jig as shown in FIG. 4. The spacer means may be made of other suitable material such as molybdenum and may be of different diameter or thickness for other embodiments of the invention in which different spacing between the various component parts of the transistor is desired for any reason. Spacer means 43 and 44 rest on the connector plate 23 of semiconductor die unit 18 as shown in FIG. 5.

A pair of solder rings 46 and 47 are threaded over leads 15 and 17 respectively and dropped onto connector plate 23 as shown in FIG. 5.

The upper electrode connector plate 28 is aligned with its slot means 48 around lead 16 and is dropped into the top of the jig 31 being guided along its edges by the inner walls of the guide portion 33. The configuration of plate 28 is such that the arm portions 49 and 51 and the portions adjacent the slot 48 and notch 28*a* fit against the inner walls of the guide portion 33. Thus the connector plate 28 is so shaped as to provide a maximum heat dissipating area consistent with permitting adequate spacing from the leads to which it is not connected. Plate 28 is notched at 28*a* to provide clearance for lead 14 with leads 15 and 17 extending between arm portions 49 and 51 and the main body of the plate. The centrally located and downwardly extending projection 29 of the plate 28 falls into contact with the upwardly extending collector electrode 22. The plate 28 may align itself in a somewhat tilted position as shown in FIG. 5. Solder ring 52 is threaded over upright lead 16 and dropped onto the surface of plate 28.

Two additional pairs of spacer means 53, 54, 56 and 57 are dropped into the slots of the jig 31 on top of the plate 28 in order to provide weight for holding the parts of the unit in proper alignment as they are secured together.

A perspective view of the partially assembled transistor at this stage of the process is shown in FIG. 4 with the various component parts stacked inside the jig and with the spacer means protruding through the slots beyond a jig. The subassembly illustrated in FIG. 4 is heated in order to soften the metal electrodes 21 and 22 so that they flow and are secured to the respective projections they contact and to melt the solder rings to affix the various parts to the appropriate leads thus establishing the desired electrical and mechanical connections. In accordance with one embodiment of the invention, the heating step is accomplished by passing the partially assembled transistor unit through a suitable furnace wherein it is heated in a non-oxidizing atmosphere to a temperature of about 300° C. This temperature is sufficient to soften the indium electrodes 21 and 22 for securing them to the projections they contact as well as to melt the various solder rings to affix base connector plate 23 to leads 15 and 17 and to affix plate 28 to the lead 16. During the heating step, the indium electrodes 21 and 22 become soft so that the base connector plate 23 and the semiconductor die unit 18, which in effect is supported on the pedestal 20 by the emitter electrode 21, vertically as electrode 21 softens and flows over the pedestal 20. The die unit 18 settles until it rests on spacers 35 and 40 positioned on the top surface of mounting base 11. At the same time connector plate 28, whose projection 29 rests on collector electrode 22, also settles vertically due to the softening of the collector electrode. Spacers 43 and 44 settle along with the base connector 23 on which they rest and serve to limit the extent to which the connector plate 28 can settle. Thus, the spacers accurately position semiconductor die unit 18 and control the vertical spacing between it and the main surface of the metal layer 13 on one side and the electrode connector plate 28 on the other.

It would be undesirable for either the electrode connector plate 28 or the metal layer 13 to come into direct contact with the germanium die 19, but, at the same time, the conducting path through the electrode should be as short as feasible so that it is desired to provide spacing in the order of 0.02 inch between the electrode connector means and the die. The use of spacer means to control the settling of the semiconductor die unit 18 and the plate 28 permits such close and accurate spacing to be obtained easily and automatically. Different spacing can be obtained if desired, by providing spacers of different thickness since the thickness of the intervening spacer determines the distance between the die and the electrode connector members.

During the settling operation the semiconductor die unit 18 and the electrode connector plate 28 align themselves into horizontal positions as shown in FIG. 6 and the electrodes flow around the contiguous projections to form the electrical connections indicated. Solder ring 25 which has been threaded over the lead 14 melts to form an electrical connection between the lead 14 and the conductive metal layer 13 from which the pedestal 20 has been formed. This establishes electrical connection through the pedestal 20 and the layer 13 between emitter electrode 21 and lead 14. In this way the layer 13 serves as the emitter connector member.

During the heating steps solder rings 46 and 47 melt and secure plate 23 to leads 15 and 17 and establish a base connection to the lead 15. The melting of solder rings 52 connects plate 28 to lead 16 and thus establishes a connection between lead 16 and the collector electrode 22. In addition to establishing electrical connection the melted solder rings also mechanically affix the plates 23 and 28 in predetermined position on the upright leads which position has been established by the horizontal spacer means.

After the securing and settling operation has been completed, the unit is cooled, the spacers withdrawn from the jig 31 and the jig lifted from the mounting base. The partially assembled unit is then subjected to such etching, cleaning, or coating treatment as is desired. A suitable cover 59 of mild steel or other suitable metal is then affixed to the shoulder 11a of the mounting base by welding or soldering. The completed transistor is illustrated in FIG. 7, the base connector plate 23 and the electrode connector plate 28 being horizontally aligned and vertically spaced a predetermined distance from one another and from mounting base 11 with the plate 28 in electrical connection with collector electrode 22 and with emitter electrode 21 in electrical connection with pedestal 20. Heat generated at the emitter junction during operation of the transistor is effectively dissipated through layer 13 to glass body 12 which is an efficient heat sink. Heat generated at the collector electrodes is dissipated through plate 28.

In some instances it is desirable to fill the space inside the cover 59 with a suitable heat transfer liquid such as a silicone oil. This is done by introducing the liquid through a hole formed in the cover 59 after it has been attached to the mounting base 11 or by inverting the cover, introducing a predetermined amount of liquid into it, lowering the unit into the cover and then securing the cover to the mounting base.

Since emitter electrode 21 is connected to the pedestal 20, it is necessary to establish an electrical connection between emitter lead 14 and pedestal 20 through metal layer 13. This may be done by the melting of solder ring 25 as previously explained or in a number of other ways. For example, a mounting base may be provided in which there is no annular exposed glass area around emitter lead 14 as there is around the other leads so that the lead is in direct contact with metal layer 13. In accordance with another embodiment, the lead 14 is bent over and its end soldered to metal layer 13. Still another method of establishing this connection is through a conductive strip across the bottom surface of insulating body 12 between the lead 14 and the portion of the metal layer 13 covering the sides of the insulating body.

In accordance with another embodiment of the invention particularly illustrated in FIGS. 8–10, the emitter electrode is not connected to a pedestal formed in the mounting base but to a projection rising from the surface of an electrode connector plate similar to the plate 28. This embodiment provides additional heat transfer area. As shown in FIG. 8 this embodiment of the invention utilizes the same parts as the embodiment just described including a mounting base 11 having a pedestal 20 rising from the upper surface thereof. In the latter embodiment of the invention the pedestal 20 serves no function, however, it is desirable that identical mounting bases be usable in either embodiment.

The latter embodiment of the invention includes the same component parts described in connection with the former embodiment and in addition includes electrode connector plate 61 which has a projection 62 rising from its surface. In addition plate 61 has slot means 63 formed in its edge. Connector plates 28 and 61 are identical and differ only in the way in which they are positioned. Projection 62 is so formed as to fit over the pedestal 20 as shown in FIG. 10 so that plate 61 will not come in contact with the mounting base 11.

In assembly of the transistor unit a pair of spacer means 64 and 66 are dropped into the jig 31 onto the upper surface of the mounting base 11. Plate 61 which serves as the emitter connector plate is aligned with the slot 63 fitting around lead 14 and dropped into the jig onto spacers 64 and 66. Solder ring 67 is then threaded over the lead 14 and dropped onto plate 61. Spacers 68 and 69 are dropped into the jig onto the plate 61 and the semiconductor die unit 18 aligned with leads 16 and 17 and dropped into the jig with the emitter electrode 21 falling against the projection or boss 62. Solder rings 46 and 47 are threaded around leads 15 and 17 respectively, spacers 43 and 44 are dropped into the jig and plate 28 which serves as the collector electrode connector is dropped into place with its projection 29 resting on the collector electrode 22 in the same manner as has been previously described. Although not shown in FIG. 8, additional spacers may be placed on top of plate 28 to weigh down the assembled plate. The partially assembled unit is heated as before with the emitter electrodes softening so that emitter electrode 21 flows around projection 62 of plate 61 and the base connector plate 23 settles vertically due to the softening of the supporting electrode 21. The amount of settling is controlled by the spacers 68 and 69. Likewise the settling of the plate 28 due to softening of electrode 22 is controlled by spacers 43 and 44 as in the case of the previously described embodiment. Although the electrode connector plates 28 and 61 and the base connector plate 23 may not align themselves in a parallel horizontal orientation on being dropped into the jig, this orientation will be assumed during the settling which takes place during the heating operation and after such heating the component parts will be aligned as shown in FIG. 10. The heating also melts the appropriate solder ring and connects emitter connector plates 62 to emitter lead 14, the base connector plate 23 to base lead 15 and the electrically inactive supporting lead 17 as well as connecting collector connector plate 28 to collector lead 16.

After the assembly has been cooled the spacer bars are withdrawn from the jig, the jig removed from the mounting base and a suitable cover 59 attached to the mounting base to form the finished transistor unit illustrated in FIG. 9. This unit is assembled as easily as that shown in FIG. 7 requiring only the addition of one part and the use of an additional pair of spacers bars.

Figure 12:
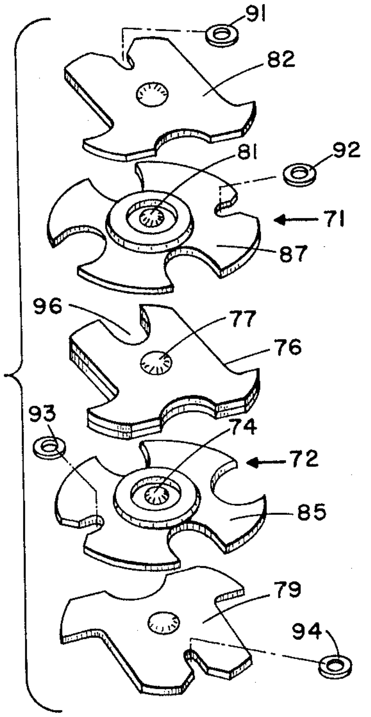
FIG. 12 is an exploded perspective view of the internal component parts of the device of FIG. 11 as they are arranged for assembly.
Figure 11:
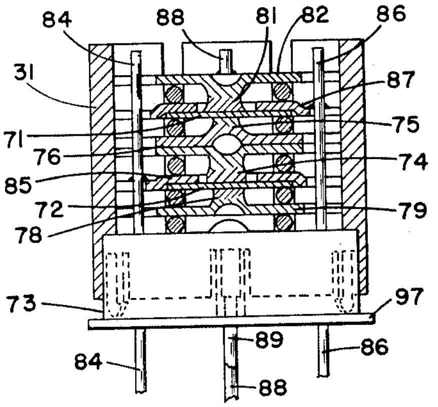
FIG. 11 is a sectional view of another embodiment of the invention which includes two semiconductor units shown at a stage of assembly wherein the parts thereof have been aligned and secured together.

FIGS. 11 and 12 illustrate an embodiment which includes two semiconductor die units 71 and 72 that are spaced vertically from each other above the mounting base 73. In this embodiment, the emitter electrode 74 of the die unit 72 is electrically common with the collector electrode 75 of the die unit 71. The electrodes 74 and 75 are connected together electrically by a connector 76 which is located between the die units 71 and 72. The connector 76 as shown in FIGS. 11 and 12 consists of two connector plates, similar to the plate 28 of FIG. 1, joined together so that there is a projection 77 on each side of the connector. Two such plates may be joined by brazing, sweating or coining for example. The electrodes 74 and 75 are fused to the respective projections of the connector 76.

The collector electrode 78 of the die unit 74 is fused to a connector plate 79 which is located just above the mounting base 73, although it will be understood that the electrode 78 could be fused directly to the metallic material of the mounting base. The emitter electrode 81 of the die unit 71 is fused to another connector plate 82 at the top of the device. Thus, it may be seen that the two semiconductor die units 71 and 72 are connected to each other in series circuit relation, with the emitter of one unit connected to the collector of the other.

The mounting base 73 has four leads 84, 86, 88 and 89 extending through it. The leads are arranged in the same manner as those of the mounting base 11 of FIG. 1, except that all four leads project on both sides of the header and are insulated from it. The lead 84 is soldered to the base connector member 85 for the semiconductor die unit 72, and thus serves as a base lead. The lead 86 serves as a base lead for the other semiconductor die unit 71 and is soldered to the base connector member 87 for that unit. The lead 88 is soldered to the emitter connector member 82 for the semiconductor die unit 71, and serves as an emitter lead for that unit. In FIG. 11, only that portion of the fourth lead 89 which projects from the bottom of the header 73 is shown, but it will be understood that another portion of this lead projects from the top of the header. The top portion of the lead 89 has been omitted in FIG. 11 in order to show the sectional configuration of the connector plates and the die units. The fourth lead 89 is soldered to the collector connector member 79 for the die unit 72. The soldering of the connector plates to the corresponding leads is accomplished by providing solder rings 91–94 at the junctures of the leads and connector members when the device is assembled, and subjecting the assembly to heat in a heating operation as previously described.

It may be seen that hte device of FIG. 11 has two base leads 84 and 86, a lead 88 for the emitter of the semiconductor die unit 71 and a lead 89 for the collector of the semiconductor die unit 72. A device of this type having two transistor elements connected in series with an emitter-to-collector connection between the units, is useful for several circuit applications. For example, a load such as a resistor may be connected to the collector lead 88 and a source of voltage may be connected to the emitter lead 89. Input signals may be supplied to the two base electrodes 84 and 86 in order to control the conduction of the transistor elements. The device may be employed, for example, in a switching circuit in which both transistor elements are turned on simultaneously to supply current to a load, and are turned off to interrupt that current.

Figure 14:
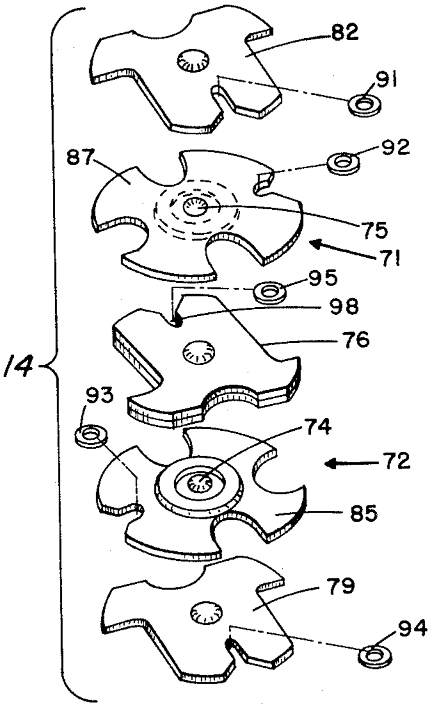
FIG. 14 is an exploded perspective view of the internal component parts of the device of FIG. 13.
Figure 13:
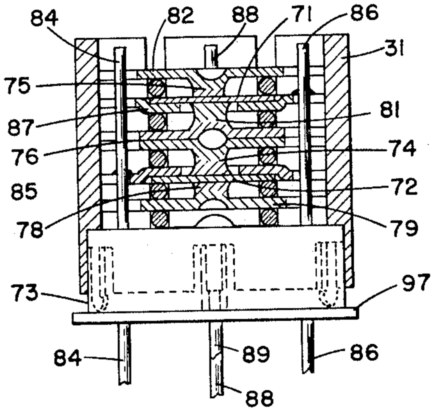
FIG. 13 is a section view of a modified form of the device of FIG. 11.

FIGS. 13 and 14 illustrate a device having two semiconductor die units 71 and 72 electrically connected in parallel circuit relation. The componet parts of the embodiment of FIGS. 13 and 14 are essentially the same as those of the embodiment of FIGS. 11 and 12, and therefore the same reference numerals have been used for the two embodiments.

In the embodiment of FIGS. 13 and 14, the component parts are oriented somewhat differently than in the embodiment of FIGS. 11 and 12. For instance, semiconductor die unit 71 is inverted in FIG. 13 as compared to FIG. 11. It may be seen that the emitter electrode 81 of this die unit is fused to an intermediate connector 76, and the emitter electrode 74 of the other die unit 72 is also fused to the intermediate connector 76. Thus, the two emitter electrodes are connected in electrically common relation with each other by the connector 76. That connector in turn is secured to the lead 88 by solder which originally is in the form of a ring 95 as shown in FIG. 14.

The collector electrodes 75 and 78 are also connected in electrically common relation with each other. The electrode 75 is fused to the connector plate 82, and the electrode 78 is fused to the connector plate 79. The two plates 79 and 82 are connected to the same lead 89 by means of the solder rings 91 and 94.

The base connector members 85 and 87 are soldered respectively to the two base leads 84 and 86 in the same manner as has been described in connection with FIG. 11. The connector 76 of FIGS. 13 and 14 includes a narrow slot 98 through which the lead 84 extends, and a soldered connection is made at this slot. The connector 76 of FIGS. 11 and 12 has a larger cut-out portion 96 through which the lead 84 extends without contacting the member 76. The other component parts of the two devices are identical except that they are positioned differently, as has been described.

The device of FIGS. 13 and 14 may be operated as a switching device in which the two transistor elements are turned on and off independently. An electrical load, such as a resistor, may be connected to the collector lead 88, and a source of supply voltage may be connected to the emitter lead 89. Input signals may be applied to the base leads 84 and 86 for controlling the conduction of the transistors, and the device may serve a gating function, for example. It is possible to provide independent leads for the two collector electrodes 75 and 78 by adding a fifth lead to the header and connecting it to one of the plates 79 and 82. Such a device may be employed in a switching circuit of the multivibrator type.

In assembling the devices of FIGS. 11–14, the various component parts are stacked vertically on the mounting base 73 together with spacer members in the same manner as has been described in connection with FIGS. 1–10. After the various elements have been assembled in an aligned condition, the assembly is subjected to heat and is then cooled in order to melt and then solidify the solder and to fuse the emitter and collector electrodes to the corresponding connector plates. As a final step, a cover is secured to the shoulder 97 of the mounting base by welding or soldering so as to form a sealed enclosure for the semiconductor units and the connector plates.

Although connector plates of metal have been described, it will be understood that the plates need not be entirely of metal. For example, plates of alumina having metallized surfaces may be used if desired. Similarly, the spacer elements need not be in the form of wires, although wires are convenient and facilitate the assembly operation.

The present invention provides a transistor of improved design which is particularly adapted to a relatively inexpensive and convenient assembly procedure in which various parts of the transistor are self-aligning during assembly and are held by gravity in their proper positions during the process of affixing them to one another. The improved structure and fabrication method enables the transistor to be manufactured with a high degree of uniformity and a high yield of electrically satisfactory products. At the same time the process of assembly can be carried out by relatively unskilled and inexperienced operators without the aid of expensive assembly equipment.

Various structural features of this invention also provides other advantages particularly applicable to power transistors since the arrangement of the heat dissipating members efficiently utilizes space available for heat dissipation. This permits the transistor to be contained in the smallest possible package consistent with electrostatic requirements. The invention is applicable to semiconductor devices other than power transistors, and is also applicable to devices of the type which include more than one semiconductor unit.

I claim:

1. In a semiconductor device the combination including, a mounting base and a plurality of upright leads retained by said base with said leads forming positioning means adapted to provide a jigging function in the assembly of said device, first and second connector members extending horizontally over said mounting base and spaced a predetermined distance from each other in the longitudinal direction of said upright leads, a semiconductor unit positioned between said connector members and having opposite sides thereof respectively connected to said first and second connector members, said connector members each having an apertured portion through which a respective one of said upright leads extends which apertured portion fits with the respective lead so as to permit assembly of said connector members and said semiconductor unit with said base by vertical stacking, and said apertured portions of said connector members being adapted to cooperate with said leads during such assembly to maintain said connector members in proper alignment with said semiconductor unit and said base.

2. A transistor device including in combination, a mounting base and a plurality of upright leads retained by said base with said leads forming positioning means adapted to provide a jigging function in the assembly of said device, first, second and third connector members extending horizontally with respect to said mounting base and spaced from each other in the longitudinal direction of said leads, a semiconductor unit having a base portion connected to an intermediate one of said connector members and having emitter and collector portions on opposite sides thereof respectively connected to the other two connector members, said connector members each having an apertured portion through which a respective one of said upright leads extends, which apertured portion fits with the respective lead so as to permit assembly of said connector members and said semiconductor unit with said base by vertical stacking, and said apertured portions being adapted to cooperate with said upright leads during such assembly to maintain said connector members in proper alignment.

3. A diminutive transistor including in combination, a mounting base, a projection extending from one surface of said mounting base, a plurality of upright leads held in said mounting base, an annular plate having slot means formed in the periphery thereof positioned with one of said leads extending through said slot means, said plate secured to said lead at a predetermined poistion thereon, a semiconductor die having a pair of opposite faces and secured to said plate along one of its faces, a pair of electrodes, one carried on each of said faces of said die, one of said electrodes secured to and in electrical contact with said projection, an electrode connector member spaced a predetermined distance from said semiconductor die and connected to another of said leads at a predetermined position thereon and boss means formed in the surface of said connector secured to and in electrical contact with the other of said electrodes.

4. A diminutive transistor including in combinaiton, a mounting base having a layer of conductive metal on the upper surface thereof, a pedestal rising from the upper surface and formed of the conductive metal layer, a plurality of upright mounting leads held in said mounting base and extending therethrough in the same direction as said pedestal, an annular plate having slot means formed in the periphery thereof positioned with one of said leads extending through said slot means, said plate secured to said lead at a predetermined position thereon and spaced a predetermined distance from said surface of said mounting base, a semiconductor die having a pair of opposite faces and secured to said plate along one of its faces, a pair of electrodes, one on each of said faces of said die, one of said electrodes electrically and mechanically secured to said pedestal, an electrode connector plate having slot means formed in the periphery thereof positioned with another of said leads extending through said slot means with said electrode connector plate connected to said other lead at a predetermined position thereon and spaced a predetermined ditsance from said semiconductor die, and boss means formed in the surface of said electrode connector plate electrically and mechanically connected to the other of said electrodes.

5. A diminutive transistor including in combination, a substantially flat semiconductor die having a pair of opposite faces, a collector electrode on one face of said die and an emitter electrode on the other face thereof, a substantially flat, plate-like conductive member supporting said semiconductor die and forming a base connection therewith, means forming an opening in the surface of said member, said die secured to said member around the periphery of the opening with one of said electrodes extending therethrough, a pair of conductive plates having substantially flat surfaces constituting a collector electrode connector and an emitter electrode connector positioned respectively on opposite sides of said die and spaced a predetermined distance therefrom with their surfaces parallel to the faces of said die, boss means formed in the surface of each connector secured to and in electrical contact and heat exchange relation with their respective electrodes, a mounting base, base, emitter and collector leads extending through and supported in said mounting base substantially perpendicular to the faces of said die, with said emitter and collector leads extending through slot means formed in the edges of said electrode connectors and electrically connected to and mechanically supporting said emitter and collector electrode connectors respectively and with said base lead extending through slot means formed in the edge of said conductive member supporting said die and electrically connected to and mechanically supporting said member.

6. In a semiconductor device the combination including, a semiconductor unit having opposite sides adapted for making electrical connections thereto, first and second connector members respectively positioned adjacent the opposite sides of said semiconductor unit, a mounting base having a plurality of lead members projecting from one side forming upstanding positioning means located circumferentially about said semiconductor unit and extending between said connector members and secured thereto so as to hold the same in alignment and spaced apart a predetermined distance, said lead members having portions projecting from said connector members available for making external electrical connections to said device, and means electrically and mechanically connecting the opposite sides of said semiconductor unit to the respective connector member adjacent thereto, said connector members having peripheral portions shaped to permit assembly by vertical stacking of said connector members and said semiconductor unit with said peripheral portions cooperating with said positioning means to provide proper alignment of the parts during assembly, such positioning being accomplished in the completed semiconductor device by said positioning means without requiring positioning of the parts by enclosure means.

7. In a transistor, the combination including a semiconductor body having a base portion and having emitter and collector electrode portions on opposite sides of said base portion, first connector means of disc-like configuration having an annular portion extending about an axis secured to and in ohmic contact with said base portion of said semiconductor body, said emitter and collector electrode portions being in alignment along said axis with one of the same projecting through said annular portion, second and third connector means of plate-like configuration respectively spaced a predetermined distance from opposite sides of said first connector means, said second and third connector means being supported in coaxial relation with said first connector means and extending parallel thereto, said second connector means having a metallic portion secured to and in ohmic contact with said emitter electrode portion, and said third connector means having a metallic portion secured to and in ohmic contact with said collector electrode portion, means encapsulating said semiconductor body and said connector means, and base, emitter and collector electrical lead members having portions respectively secured mechanically and connected electrically to said first, second and third connector means and extending substantially perpendicular thereto, said portions of said lead members constituting positioning means which holds said connector means in accurate alignment without requiring said encapsulating means to be specially shaped, and said lead members having portions projecting through said encapsulating means and available on the outside thereof for making electrical connections.

8. An electronic device including in combination, a mounting base, and a plurality of upright leads retained by said base, a plurality of plate-like members extending horizontally over said mounting base and spaced a predetermined distance from each other in the longitudinal direction of said upright leads, first and second semiconductor units mounted on respective ones of said plate-like member and each including an active semiconductor device and having contact portions for connection to corresponding ones of said upright leads, said plate-like members including electrically conductive material forming electrical connections between said contact portions and said corresponding leads thereby interconnecting said semiconductor devices into an operative circuit, and said plate-like members having aperture therein through which said upright leads extend so as to permit assembly of said plate-like members and said first and second semiconductor units with said mounting base by verical stacking.

9. An electronic device including in combination, a mounting base, a plurality of leads projecting upright from one side of said base and having portions on the other side of said base available for making electrical connections externally of said device, a plurality of plate-like members extending horizontally over said mounting base and spaced a predetermined distance from each other in the longitudinal direction of said upright leads, a first semiconductor unit mounted on one of said plate-like members and a second semiconductor unit mounted on another of said plate-like members, with said first and second semiconductor units each including PN junctions forming an active semiconductor device and having contact portions for connection to corresponding ones of said upright leads, said plate-like members including electrically conductive material forming electrical connections between said contact portions of said semiconductor units and said corresponding leads thereby interconnecting said active semiconductor devices into an operative circuit, and said plate-like members having apertured portions through which said upright leads extend and adapted to cooperate with said leads during assembly of said device to maintain said plate-like members in a proper condition of alignment, and cover means forming with said mounting base an enclosure for said semiconductor units and said plate-like members.

10. An electronic device including in combination, a mounting base, a plurality of leads projecting upright from a one side of said base and having portions on the other side of said base available for making external electrical connections, a plurality of plate-like connector members extending horizontally over said mounting base and spaced a predetermined distance from each other in the longitudinal direction of said upright leads, first and second semiconductor units respectively mounted on first and second one of said connector members, said semiconductor units each having one contact portion connected to a third one of said connector members positioned between said semiconductor units and having further contact portions connected respectively to fourth and fifth ones of said connector members, said place-like connector members having apertures therein through which said upright leads extend so as to permit assembly of said connector members and said semiconductor units with said mounting base by vertical stacking, and means connecting individual ones of said leads to corresponding ones of said connector members at said apertures therein.

No references cited.